United States Patent
Wu et al.

(10) Patent No.: US 11,170,815 B1
(45) Date of Patent: Nov. 9, 2021

(54) CANCELLING ADJACENT TRACK INTERFERENCE

(71) Applicant: Seagate Technology LLC, Fremont, CA (US)

(72) Inventors: Zheng Wu, San Jose, CA (US); Jason Bellorado, San Jose, CA (US); Marcus Marrow, San Jose, CA (US); Vincent Brendan Ashe, San Jose, CA (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 16/986,590

(22) Filed: Aug. 6, 2020

Related U.S. Application Data

(63) Continuation of application No. 16/673,814, filed on Nov. 4, 2019, which is a continuation of application (Continued)

(51) Int. Cl.
*G11B 5/09* (2006.01)
*G11B 20/10* (2006.01)
(Continued)

(52) U.S. Cl.
CPC ........ *G11B 20/10046* (2013.01); *G06F 17/17* (2013.01); *G11B 5/00* (2013.01);
(Continued)

(58) Field of Classification Search
CPC .. G11B 5/00; G11B 5/09; G11B 20/12; G11B 20/10; G11B 20/0013; G11B 27/36;
(Continued)

(56) References Cited

U.S. PATENT DOCUMENTS 5,461,644 A   10/1995   Bermans et al.
5,621,769 A    4/1997   Wan et al.
(Continued)

OTHER PUBLICATIONS

Guo, Yuanbin, "An Efficient Circulant MIMO Equalizer for CDMA Downlink: Algorithm and VLSI Architecture", Hindawi Publishing Corporation, Jan. 1, 2006 00:00:00.0, pp. 1-18.
(Continued)

*Primary Examiner* — Nabil Z Hindi
(74) *Attorney, Agent, or Firm* — Kirk A. Cesari

(57) ABSTRACT

An apparatus may comprise a circuit configured to receive first underlying data corresponding to a first signal and receive a second signal corresponding to second underlying data. The circuit may determine an interference component signal based on the first underlying data corresponding to the first signal and a first channel pulse response shape for the first signal, determine estimated decisions corresponding to the second signal based on the second signal, and determine an estimated signal based on the estimated decisions corresponding to the second signal and a second channel pulse response shape for the second signal. The circuit may then generate a remaining signal based on the estimated signal and the second signal, generate an error signal based on the interference component signal and the remaining signal, and adapt one or more parameters of the first channel pulse response shape based on the error signal.

18 Claims, 10 Drawing Sheets

Related U.S. Application Data

No. 16/144,659, filed on Sep. 27, 2018, now Pat. No. 10,468,060.

(51) Int. Cl.
*G06F 17/17* (2006.01)
*G11B 5/00* (2006.01)

(52) U.S. Cl.
CPC .. *G11B 20/10037* (2013.01); *G11B 20/10231* (2013.01); *G11B 20/10388* (2013.01); *G11B 2005/0026* (2013.01)

(58) Field of Classification Search
CPC ............... G11B 20/18; G11B 20/10222; G11B 20/10046; G11B 20/10007; G11B 5/02; H04L 7/0029; H04L 25/4917
USPC ................................................ 360/39, 46, 55
See application file for complete search history.

(56) References Cited

U.S. PATENT DOCUMENTS

| | | | |
|---|---|---|---|
| 5,862,192 | A | 1/1999 | Huszar et al. |
| 6,111,712 | A | 8/2000 | Vishakhadatta et al. |
| 6,181,213 | B1 | 1/2001 | Chang |
| 6,396,887 | B1 | 5/2002 | Ware et al. |
| 6,438,185 | B1 | 8/2002 | Huttunen |
| 6,519,107 | B1 | 2/2003 | Ehrlich et al. |
| 6,549,587 | B1 | 4/2003 | Li |
| 6,581,182 | B1 | 6/2003 | Lee |
| 7,085,330 | B1 | 8/2006 | Shirali |
| 7,133,239 | B1 | 11/2006 | Hartman et al. |
| 7,440,208 | B1 | 10/2008 | McEwen et al. |
| 8,027,117 | B1 | 9/2011 | Sutardja et al. |
| 8,139,301 | B1 | 3/2012 | Li et al. |
| 8,160,181 | B1 | 4/2012 | Song et al. |
| 8,296,637 | B1 | 10/2012 | Varnica et al. |
| 8,543,894 | B1 | 9/2013 | Varnica et al. |
| 8,887,033 | B1 | 11/2014 | Varnica et al. |
| 8,953,276 | B1 | 2/2015 | Pokharel et al. |
| 8,970,976 | B1 * | 3/2015 | Hwang ............ G11B 20/10009 360/39 |
| 9,019,642 | B1 | 4/2015 | Xia et al. |
| 9,099,132 | B1 | 8/2015 | Grundvig et al. |
| 9,189,315 | B1 | 11/2015 | Varnica et al. |
| 9,245,578 | B1 | 1/2016 | Wang et al. |
| 9,246,668 | B1 | 1/2016 | Yu et al. |
| 9,311,959 | B1 | 4/2016 | Fan et al. |
| 9,385,757 | B1 | 7/2016 | Nangare |
| 9,489,976 | B2 | 11/2016 | Jury et al. |
| 9,536,563 | B1 | 1/2017 | Liu et al. |
| 9,645,763 | B2 | 5/2017 | Sankaranarayanan et al. |
| 9,786,316 | B2 * | 10/2017 | Mathew ............ G11B 20/10009 |
| 9,947,362 | B1 * | 4/2018 | Venkataramani ............................. G11B 20/10046 |
| 9,998,136 | B1 | 6/2018 | Wu |
| 10,014,026 | B1 | 7/2018 | Wu et al. |
| 10,164,760 | B1 | 12/2018 | Bellorado et al. |
| 10,177,771 | B1 | 1/2019 | Bellorado et al. |
| 10,180,868 | B2 | 1/2019 | Alhussien et al. |
| 10,276,233 | B1 | 4/2019 | Danjean et al. |
| 10,297,281 | B1 | 5/2019 | Bellorado et al. |
| 10,469,290 | B1 | 11/2019 | Marrow et al. |
| 10,498,565 | B1 | 12/2019 | Azenkot et al. |
| 2002/0080898 | A1 | 6/2002 | Agazzi et al. |
| 2003/0185114 | A1 | 10/2003 | Liaw |
| 2003/0198152 | A1 | 10/2003 | Morishima |
| 2004/0101068 | A1 | 5/2004 | Wang et al. |
| 2005/0270687 | A1 | 12/2005 | Zweighaft |
| 2006/0215290 | A1 | 9/2006 | Kurtas et al. |
| 2008/0007855 | A1 | 1/2008 | Vityaev et al. |
| 2009/0028252 | A1 | 1/2009 | Lu |
| 2009/0097606 | A1 | 4/2009 | Hutchins et al. |
| 2009/0262870 | A1 | 10/2009 | Ashbrook et al. |
| 2011/0072335 | A1 | 3/2011 | Liu et al. |
| 2012/0082018 | A1 | 4/2012 | Gushima et al. |
| 2013/0201838 | A1 | 8/2013 | Homchaudhuri et al. |
| 2014/0009192 | A1 | 1/2014 | Suzuki |
| 2014/0035638 | A1 | 2/2014 | Bode |
| 2014/0223114 | A1 | 8/2014 | Wang et al. |
| 2015/0022916 | A1 | 1/2015 | Zou et al. |
| 2015/0355838 | A1 | 12/2015 | Chen et al. |
| 2015/0380048 | A1 | 12/2015 | Oberg et al. |
| 2016/0019921 | A1 | 1/2016 | Bui et al. |
| 2016/0293205 | A1 | 10/2016 | Jury et al. |
| 2016/0351227 | A1 | 12/2016 | Koshino |
| 2017/0125089 | A1 | 5/2017 | Sankaranarayanan et al. |
| 2017/0125110 | A1 | 5/2017 | Sankaranarayanan et al. |
| 2017/0236592 | A1 | 8/2017 | Alhussien et al. |
| 2017/0249206 | A1 | 8/2017 | Jeong et al. |
| 2018/0011753 | A1 | 1/2018 | Alhussien et al. |
| 2018/0012663 | A1 | 1/2018 | Alhussien et al. |
| 2018/0277158 | A1 | 9/2018 | Kishino |
| 2018/0367164 | A1 | 12/2018 | Marrow et al. |
| 2019/0130967 | A1 | 5/2019 | Danjean et al. |
| 2020/0065262 | A1 | 2/2020 | Bellorado |

OTHER PUBLICATIONS

Hicks, James, "Overloaded Array Processing with Spatially Reduced Search Joint Detection", Virginia Polytechnic Institute & State University, May 10, 2000 00:00:00.0, pp. 1-144.

Mohammad, Maruf, "Blind Acquisition of Short Burst with Per-Survivor Processing (PSP)", Virginia Polytechnic Institute & State University, Nov. 26, 2002 00:00:00.0, pp. 1-127.

Nechaev, Y. B., et al., "Increasing Efficiency of Information Transmission with Interference Influence by the Use of Multi-Parameter Adaptation", East-West Design & Test Symposium (EWDTS 2013), Rostov-on-Don, 2013, pp. 1-4 (Year: 2013).

* cited by examiner

CANCELLING ADJACENT TRACK INTERFERENCE

CROSS REFERENCE TO RELATED APPLICATIONS

The present application is a continuation of and claims priority to U.S. patent application Ser. No. 16/673,814, filed Nov. 4, 2019, which is a continuation of and claims priority to U.S. patent application Ser. No. 16/144,659, filed Sep. 27, 2018, now U.S. Pat. No. 10,468,060; the contents of which is hereby incorporated by reference in its entirety.

SUMMARY

In certain embodiments, an apparatus may comprise a circuit configured to receive first underlying data corresponding to a first signal and receive a second signal corresponding to second underlying data. The circuit may determine an interference component signal based on the first underlying data corresponding to the first signal and a first channel pulse response shape for the first signal, determine estimated decisions corresponding to the second signal based on the second signal, and determine an estimated signal based on the estimated decisions corresponding to the second signal and a second channel pulse response shape for the second signal. The circuit may then generate a remaining signal based on the estimated signal and the second signal, generate an error signal based on the interference component signal and the remaining signal, and adapt one or more parameters of the first channel pulse response shape based on the error signal.

In certain embodiments, a system may comprise a first channel pulse response shape circuit configured to receive first underlying data corresponding to a first signal, determine an interference component signal based on the first underlying data corresponding to the first signal and a first channel pulse response shape for the first signal, and adapt one or more parameters of the first channel pulse response shape based on an error signal. The system may further comprise a detector circuit configured to receive a second signal corresponding to second underlying data and determine estimated decisions corresponding to the second signal based on the second signal. The system may also include second channel pulse response shape circuit configured to determine an estimated signal based on the estimated decisions corresponding to the second signal and a second channel pulse response shape for the second signal, a first adder configured to generate a remaining signal based on the estimated signal and the second signal and a second adder configured to generate an error signal based on the interference component signal and the remaining signal.

In certain embodiments, a method may comprise receiving, by a first channel pulse response shape circuit, first underlying data corresponding to a first signal and determining, by the first channel pulse response shape circuit, an interference component signal based on the first underlying data corresponding to the first signal and a first channel pulse response shape for the first signal. The method may further comprise receiving, by a detector circuit, a second signal corresponding to second underlying data, determining, by the detector circuit, estimated decisions corresponding to the second signal based on the second signal, and determining, by a second channel pulse response shape circuit, an estimated signal based on the estimated decisions corresponding to the second signal and a second channel pulse response shape for the second signal. In addition, the method may comprise generating, by a first adder, a remaining signal based on the estimated signal and the second signal, generating, by a second adder, an error signal based on the interference component signal and the remaining signal, adapting, by the first channel pulse response shape circuit, one or more parameters of the first channel pulse response shape based on an error signal using least mean square (LMS) adaptation, and cancelling, by a third adder, interference in the second signal using the interference component signal to generate a cleaned signal.

DETAILED DESCRIPTION

Figure 1:
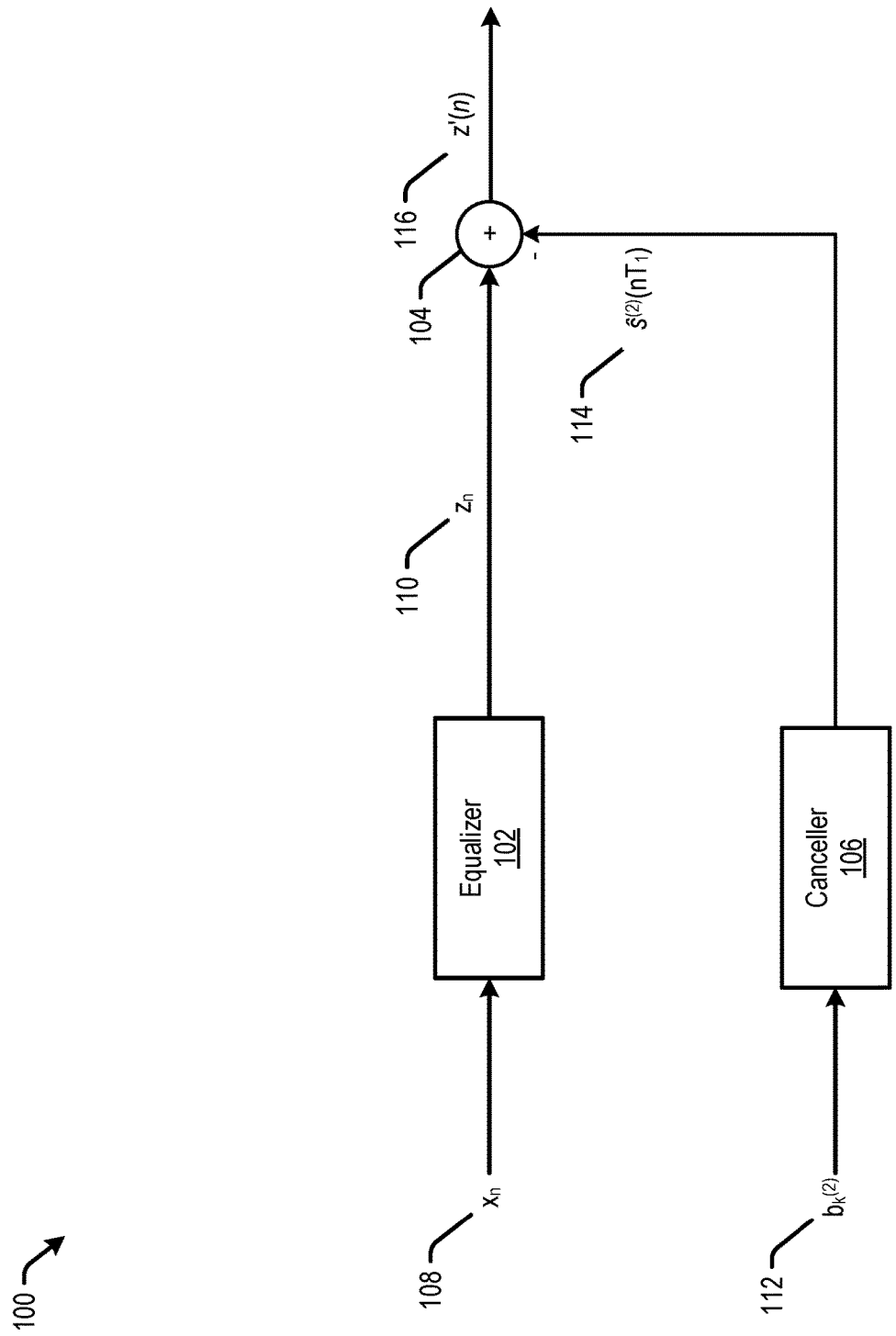
FIG. 1 is a block diagram of a system of asynchronous interference cancellation, in accordance with certain embodiments of the present disclosure.

In the following detailed description of the embodiments, reference is made to the accompanying drawings which form a part hereof, and in which are shown by way of illustrations. It is to be understood that features of the various described embodiments may be combined, other embodiments may be utilized, and structural changes may be made without departing from the scope of the present disclosure. It is also to be understood that features of the various embodiments and examples herein can be combined, exchanged, or removed without departing from the scope of the present disclosure.

In accordance with various embodiments, the methods and functions described herein may be implemented as one or more software or firmware programs running on a computer processor or controller. In accordance with another embodiment, the methods and functions described herein may be implemented as one or more software or firmware programs running on a computing device, such as a personal computer that is using a disc drive. Dedicated hardware implementations including, but not limited to, application specific integrated circuits, programmable logic arrays, and other hardware devices can likewise be constructed to implement the methods and functions described herein. Further, the methods described herein may be implemented as a computer readable storage medium or memory device including instructions that when executed cause a processor to perform the methods.

The present disclosure generally relates to cancellation of interference between signals, and in some embodiments, the present disclosure relates to interference between signals with different bit rates. Some systems, such as electrical, electronic, motor drive, processing, or other systems may receive a signal of interest that include interference from another signal with a bit rate that is different from the signal of interest. The received signal of interest and the signal that is the source of the interference can be processed to produce a cleaned signal that can be provided to a detector for detection of bit values of a bit sequence corresponding to data underlying the signal of interest.

For example, the underlying data embodied by a signal that is the source of the interference may be utilized to generate a channel pulse response shape with the sampling rate or bit rate of the signal that is the source of the interference. The channel pulse response shape and the underlying data embodied by the interfering signal may be used to approximate the portion of the signal of interest which is the result of the interference (also referred to herein as an interference component). The interference component may then be removed from the received signal of interest to generate a cleaned signal. A detector or decoder may generate a bit sequence of decisions based on the cleaned signal that may have a lower error rate than would be achieved based on the received signal of interest.

In addition, the present disclosure relates to improving the cancellation of interference by improving the error signal used in adaptation of parameters of the channel pulse response shape used to approximate the interference component. The disclosed improvements to the cancellation of interference by improving the error signal may be utilized in systems where the source of interference and the signal of interest have the same data rate or different data rates. In some embodiments, detector or decoder decisions corresponding to the signal of interest may be used to estimate the signal of interest without interference. The estimated signal may then be subtracted from the received signal of interest to generate a remaining signal which may be an estimate of the interference component and noise in the received signal of interest. The remaining signal may then be subtracted from the interference component determined by the channel pulse response shape to generate an error signal. The error signal may then be used to adapt the parameters of the channel pulse response shape used to generate the interference component using, for example, a least means square (LMS) algorithm. Further improvements to the cancellation of interference may be achieved by selectively using the remaining signal when the decisions have an error rate below a threshold and by iteratively updating the decisions used to generate the estimated signal using the cleaned signal of the prior iteration.

Referring to FIG. 1, a block diagram of a system of asynchronous interference cancellation is shown and is generally designated 100. The system 100 can be configured to produce a cleaned signal by canceling interference in a signal of interest that results from another signal that may asynchronous with the signal of interest. It can include an equalizer 102 that may be coupled to an adder 104. The system 100 may further include a canceller 106 which may be coupled to the adder 104.

The equalizer 102 may receive a signal of interest 108 ($x_n$) from which interference is to be cancelled. In some examples, the signal of interest 108 ($x_n$) may be a sequence of digital samples, for example, generated by an analog-to-digital converter (ADC) from a continuous time input signal. The equalizer 102 may generate an equalized signal 110 ($z_n$) based on the signal 108.

The canceller 106 may receive underlying data corresponding to an adjacent signal 112 ($b_k^{(2)}$) which can be, for various reasons, the source of the interference in the signal 108. The underlying data in the signal 110 and adjacent signal 112 may both be bit sequences. The adjacent signal 112 may have a different bit rate from the signal 110. The canceller 106 may generate an interference component signal 114 ($\hat{s}^{(2)}(nT_1)$, where $T_1$ is the center track data period) which may be an estimate of the interference from the adjacent signal 112 that is present in the signal 108.

The adder 104 may receive the equalized signal 110 and the interference component signal 114. The adder 104 may combine the equalized signal 110 and the interference component signal 114 (e.g. subtract the interference component signal 114 from the equalized signal 110) such that the estimated interference 114 is removed from the equalized signal 110. In this way, the adder 104 may generate the cleaned signal 116 (z'(n) or z' n).

Each of the equalizer 102, adder 104, and canceller 106 may be a separate circuit, a system on chip (SOC), firmware, a processor(s), or other system not listed, or any combination thereof.

The following discussion provides an example of the operation of the canceller 106.

In the following example, which may be used in magnetic recording, the bits of the signal 110 (e.g. a center track or track of interest) may have a frequency of $f_1$ and a corresponding period of $T_1$ and the bits of the adjacent signal 112 (e.g. an adjacent track or side track) may have a frequency of $f_2$ and a corresponding period of $T_2$. The read back signal from center track can be written as:

$$z(t) = s^{(1)}(t) + s^{(2)}(t) + N(t)$$

where $s^{(1)}(t)$ may be the center track signal, $s^{(2)}(t)$ may be the side track interfering signal and $N(t)$ may be the noise.

The read back signal may be sampled at the center track frequency $f_1$ when reading back the center track sectors. The digitized signal (with index n) may be written as:

$$z(nT_1) = s^{(1)}(nT_1) + s^{(2)}(nT_1) + N(nT_1)$$

In some embodiments, the signal $z(nT_1)$ may be the output of a filter of an input read back signal in a read channel system (e.g. the equalized signal 110 ($z_n$)).

Some embodiments may estimate the interfering signal using a pulse response shape of the side track signal. For example, the continuous time pulse response shape may be represented by $h^{(2)}(t)$ and the estimated interfering signal (continuous time) may be written as:

$$\hat{s}^{(2)}(t) = \sum_k b_k^{(2)} h^{(2)}(t - kT_2)$$

where $b_k^{(2)}$ may be the underlying the side track written data or decoded data for a continuous time read signal for the side track.

The continuous time side track pulse response shape may be interpolated from the values at particular sampling points using the sampling rate $f_2$, e.g:

$$h^{(2)}(t) = \sum_i C(t - iT_2)h^{(2)}(iT_2)$$

When t goes to positive and negative infinity, the pulse response shape may go to zero. As such, some embodiments may determine the pulse response shape for a finite length, for example, 2L+1. In such a case, the pulse response shape may be determined as:

$$h^{(2)}(t) = \sum_{i=-L}^{L} C(t - iT_2)h^{(2)}(iT_2)$$

In turn, the estimated interference signal may be written as:

$$\hat{s}^{(2)}(t) = \sum_k b_k^{(2)} \sum_{i=-L}^{L} C(t - kT_2 - iT_2)h^{(2)}(iT_2)$$

Herein, $h_i^{(2)} = h^{(2)}(iT_2)$. By switching the summation order of i and k in the above equation, and evaluating the estimated signal at sampling points of center track signals, the estimated interference may be written as:

$$\hat{s}^{(2)}(nT_1) = \sum_{i=-L}^{L} \sum_k b_k^{(2)} C(nT_1 - kT_2 - iT_2)h^{(2)}(iT_2)$$

Herein, d(n,i) may be defined as $d(n,i) = \sum_k b_k^{(2)} C(nT_1 - kT_2 - iT_2)$. As such, the estimated side track signal may be written as:

$$\hat{s}^{(2)}(nT_1) = \sum_{i=-L}^{L} d(n,i) h^{(2)}(iT_2)$$

In cases where $T_1 \neq T_2$, the signal d(n,i) may not be expressible as a function of n−i. Therefore, d(n,i) may need to be computed for all i at time n.

To compute d(n,i), some embodiments may utilize the expression:

$$nT_1 - kT_2 - iT_2 = \left(\frac{nT_1}{T_2} - k - i\right)T_2 = (m + \phi_n)T_2$$

where $\phi_n$ is a fractional part of the phase (smaller than 1) at time n. As such, $$d(n,i) = \sum_m b_{\left\lfloor \frac{nT_1}{T_2} \right\rfloor - m - i}^{(2)} C_l(m + \phi_n)$$

where $C_I$ may be coefficients for an interpolation filter. The interpolation filter taps $C_I(j)$ may decay to zero when j goes to positive and negative infinity. As such, some embodiments may use a fixed length interpolation filter. In some embodiments, the coefficients may be stored in a look-up table (LUT) for different $\phi$. The input to the LUT may be the phase $\phi_n$, which may be within the range of [0,1]. An accumulator for phase may track both the movement of the integer portion of $nT_1/T_2$ and the fractional portion $\phi_n$.

In the above equation, for different n, the coefficients of the interpolation filter may be different. As such, in some embodiments, the system may include a structure or functionality to generate the streams {d(n,i)}, i=−L, . . . , L. Such an example structure is shown in FIG. 2.

Figure 2:
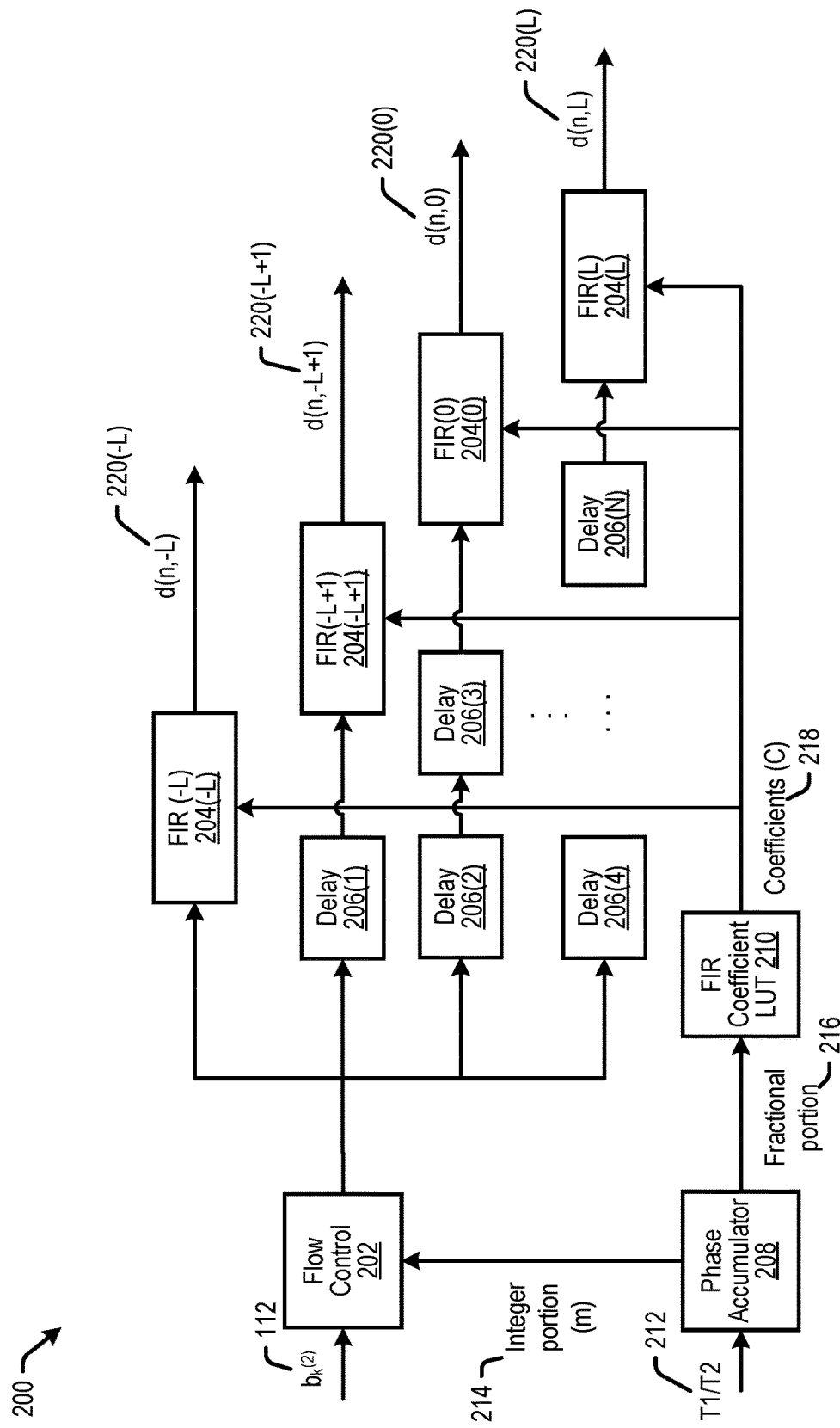
FIG. 2 is a block diagram of a system of asynchronous interference cancellation, in accordance with certain embodiments of the present disclosure.

Referring to FIG. 2, a block diagram of a system of asynchronous interference cancellation is shown and is generally designated 200. The system 200 can be configured to produce the streams {d(n,i)}, i=−L, . . . , L discussed above. System 200 may include a flow control module 202 that may be coupled to an FIR(−L) 204(−L) and delay gates 206(1)-206(N) which may be coupled in delay chains to FIR(−L+1) 204(−L+1) to FIR(L) 204(L). The system 200 may further include a phase accumulator 208 which may be coupled to the flow control module 202 and a FIR coefficient lookup table (LUT) 210. In turn, the FIR coefficient LUT 210 may be coupled to FIR(−L) 204(−L) to FIR(L) 204(L).

Each of the flow control module 202, FIR(−L) 204(−L) to FIR(L) 204(L), delay gates 206(1)-206(N), phase accumulator 208, and FIR coefficient LUT 210 may be a separate circuit, a system on chip (SOC), firmware, a processor(s), or other system not listed, or any combination thereof.

In operation, the phase accumulator 208 may determine $nT_1/T_2$ 212 where n is increasing. The integer portion (m) 214 of $nT_1/T_2$ 212 may be output to the flow control module 202. Further, the fractional portion 216 of $nT_1/T_2$ 212 may be output to the FIR coefficient LUT 210.

The flow control module 202 may receive the underlying data corresponding to the adjacent signal 112 ($b_k^{(2)}$). Based on the integer portion 214 of $nT_1/T_2$ 212, the flow control module 202 may provide $b_k^{(2)}$ 112 to the FIR(−L) 204(−L) and FIR(−L+1) 204(−L+1) to FIR(L) 204(L) via delay lines 206(1) to delay lines 206(N). As shown in the equation above, for different FIR 204, the delay of the input may be different.

In some examples, the flow control module 202 may determine which bits of the $b_k^{(2)}$ stream 112 to provide to the FIRs 204. For example, when $T_1/T_2=0.8$, the accumulation of $nT_1/T_2$ may be 0, 0.8, 1.6, 2.4, 3.2, 4.0, 4.8, 5.6 and so on. Based on this, the integer portion of the accumulation of $nT_1/T_2$ may be 0, 0, 1, 2, 3, 4, 4, 5 and so on. As such, the flow control module may not need to fetch and provide a new bit from the $b_k^{(2)}$ stream 112 to the FIRs 204 every cycle. For example, the second indexes of 0 and 4 in the sequence (e.g. the second and seventh integers in the sequence of the accumulation of $nT_1/T_2$ above).

On the other hand, when $T_1/T_2>1$, for example, $T_1/T_2=1.2$, the accumulation of $nT_1/T_2$ may be 0, 1.2, 2.4, 3.6, 4.8, 6, 7.2, 8.4, 9.6, and so on. Based on this, the integer portion may be 0, 1, 2, 3, 4, 6, 7, 8, 9, and so on. As listed, the integer portion may jump, here, from 4 to 6. In such a scenario, the flow control module may fetch and provide two bits from the $b_k^{(2)}$ stream 112 to the FIRs 204 during this cycle.

However, some embodiments may utilize various other arrangements in place of or in addition to the flow control module. For example, a control signal may be used at the reader, input or source of the $b_k^{(2)}$ stream 112 and a write control signal may be used at the output of the FIRs to perform a similar function to the flow control module. For example, the input control signal may skip a bit of the $b_k^{(2)}$ stream 112 from time to time when $T_1/T_2<1$, while the output may skip an output bit from the FIRs 204 (e.g. while the input may still be shifted into the FIRs 204) from time to time when $T_1/T_2>1$.

The FIR coefficient LUT 210 may utilize the fractional portion of $nT_1/T_2$ 212 to determine the FIR coefficients (C) 218, for example, for each of FIR(−L) 204(−L) to FIR(L) 204(L). The FIR coefficients (C) 218 may be determined for various phases (e.g. fractional portions), regions, sets of tracks or signals at the time of manufacture or during operation and stored in the FIR coefficients LUT 210.

In some embodiments, each of FIR(−L) 204(−L) to FIR(L) 204(L) may generate a stream d(n,i) (e.g. d(n,−L) 220(−L) to d(n, L) 220(L)). For example, d(n,−L) 220(−L) to d(n, L) 220(L) may be determined based on the equation above from the underlying data corresponding to the adjacent signal 112 ($b_k^{(2)}$) and the FIR coefficients (C) 218.

Figure 3:
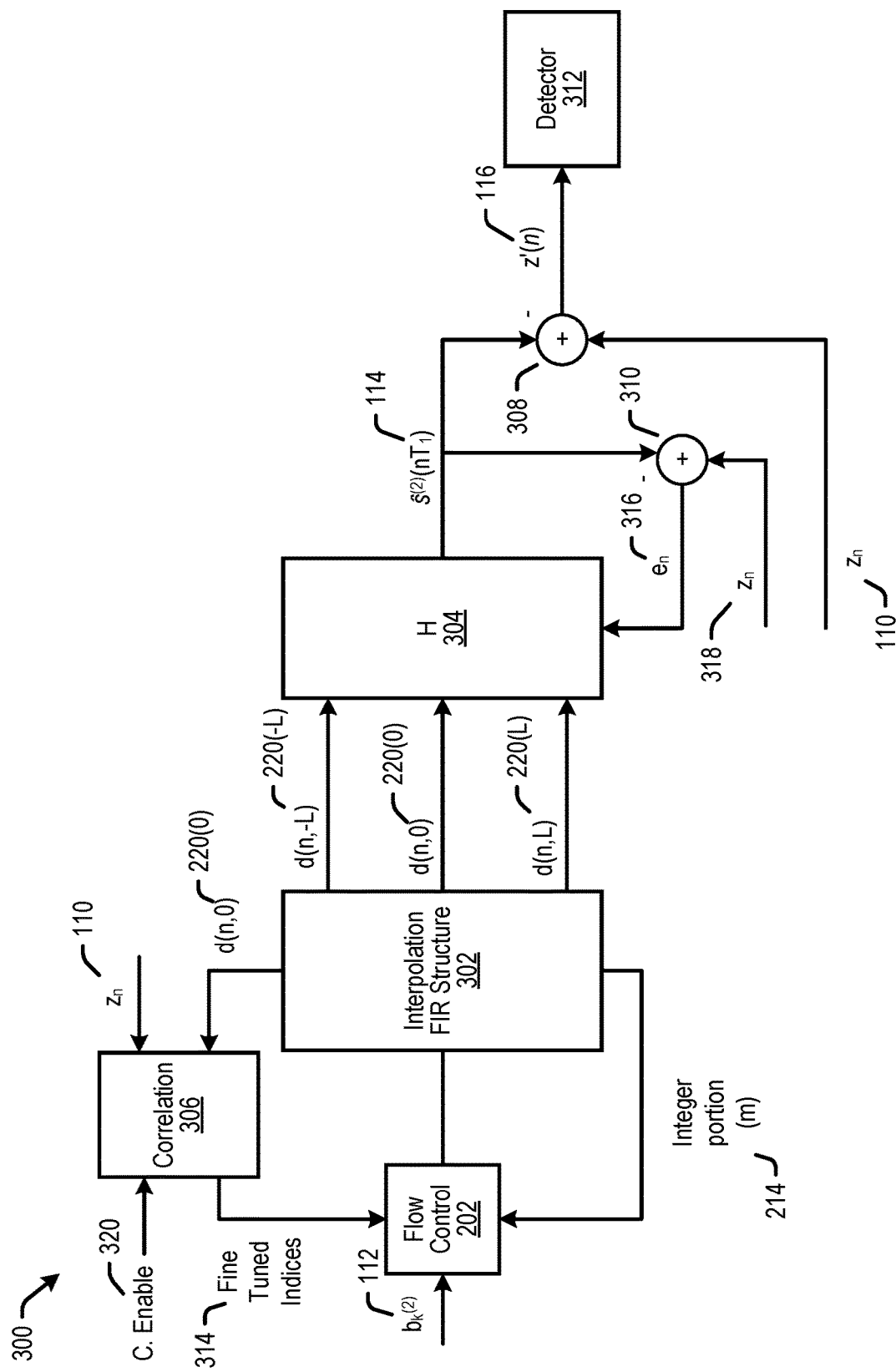
FIG. 3 is a block diagram of a system of asynchronous interference cancellation, in accordance with certain embodiments of the present disclosure.

Referring to FIG. 3, a block diagram of a system of asynchronous interference cancellation is shown and is generally designated 200. The system 300 may be configured to utilize the structure of FIG. 2 to generate an interference component signal 114 ($\hat{s}^{(2)}(nT_1)$) based on the streams {d(n,i)}, i=−L, ..., L.

As shown, system 300 may include the system 200. In particular, the system 300 may include the flow control module 202 which may be coupled to the interpolation FIR structure 302. The interpolation FIR structure 302 may include the FIR(−L) 204(−L) to FIR(L) 204(L), delay gates 206(1)-206(N), phase accumulator 208, and FIR coefficient LUT 210 as discussed above with respect to FIG. 2. The interpolation FIR structure 302 may be coupled to the flow control module 202, a channel pulse response shape module (H) 304 and a correlation module 306. The correlation module 306 may further be coupled to the flow control 202. The channel pulse response shape module (H) 304 may be coupled to the adders 308 and 310. In turn, the adder 310 may be coupled to the channel pulse response shape module (H) 304.

In operation, the flow control module 202 may generally operate as discussed above to receive the underlying data corresponding to the adjacent signal 112 ($b_k^{(2)}$). Based on the integer portion (m) 214 of T1/T2 212, the flow control module 202 may provide $b_k^{(2)}$ 112 to the interpolation FIR structure 302 (e.g. FIR(−L) 204(−L) to FIR(L) 204(L)). In addition to the inputs previously discussed, the flow control module 202 may further utilize fine-tuned indices 314 to align the adjacent signal and signal of interest at the integer scale.

As mentioned above, the interpolation FIR structure 302 may include the FIR(−L) 204(−L) to FIR(L) 204(L), delay gates 206(1)-206(N), phase accumulator 208, and FIR coefficient LUT 210 and these structures may operate as discussed above with respect to FIG. 2 to determine d(n,−L) 220(−L) to d(n, L) 220(L).

The correlation module 306 may operate to determine the fine-tuned indices 314 that may be used by the flow control module 202 to align the estimated adjacent signal and signal of interest (e.g. center track) at the integer scale. In particular, the side track data and the center track data may not be aligned at the integer scale at the beginning of the disclosed operation based solely on the integer portion (m).

The correlation module 306 may be regarded as performing a separate step before the general operations through the FIRs (204) other than the FIR(0) 204(0) and the adaptation of the channel pulse response shape module (H) 304. The correlation module 306 may utilize an interpolated sequence, for example, starting from a bit $b_0^{(2)}$, which may correlate to a read position a controller or firmware may estimate from an underlying media format (e.g. a format used by a magnetic storage media). The interpolated sequence may be correlated with the incoming signal $z_n$ 110. This correlation may generate fine-tuned indices 314 which may be utilized by the flow control module to refine a starting index in subsequent operation.

The correlation step may not be repeated in some embodiments. In particular, the correlation module 306 may receive a correlation enable signal 320 from the controller or firmware discussed above when the starting index is being determined. Subsequent to the adjustment of starting index, the correlation enable signal 320 may disable operation of module 306. In some embodiments, a dedicated duplicate of FIR(0) 204(0) may be included for the correlation module 306 rather than have d(n, 0) 220(0) supplied by the FIR(0) 204(0) in the interpolation FIR structure 302. In other embodiments, the interpolated sequences may be saved in a memory before the operations described herein. In such an embodiment, the correlation result may be utilized to fetch the sequence from the memory at a refined starting index.

In order to find a rough alignment (within $T_1$), some embodiments may correlate the center track signal and the side track resampled data (e.g., may correlate the sequence {$z(nT_1)$, n=0, ..., N−1} 110 with {d(j, 0), j=0, ..., N−1}) to find out a peak. The correlation length N may be various sizes. The length of the sequence may encompass the whole sequence of, for example, a sector. However, in some embodiments, the length of the sequence may be shorter and determined according to complexity and peak detection trade off.

As mentioned above, in some embodiments, the correlation module 306 may utilize the stream d(n, 0) 220(0) to correlate with the center track read back signal $z(nT_1)$ 110. A shift may be determined based on a correlation peak for the signals and output to the flow control module 202 as fine-tuned indices 314. More particularly, in FIG. 3, the fine-tuned indices 314 may be returned to the flow control module 202, which may result in $b_k^{(2)}$ being adjusted. For example, the determined shift may be used by the flow control module 202 to adjust the alignment of streams d(n,i) 220 to the center track signal (e.g. adjust the timing of d(n,i) 220 for the interpolation FIR structure 302). In some embodiments, instead of adjusting $b_k^{(2)}$, the adjustment can be made directly on d(n,i).

The channel pulse response shape module (H) 304 may operate to generate and apply a channel pulse response shape $h^{(2)}(iT_2)$ or $h_i^{(2)}$ to the streams d(n,i) 220 to generate the interference component signal 114 ($\hat{s}^{(2)}(nT_1)$) based on the equation:

$$\hat{s}^{(2)}(nT_1) = \sum_{i=-L}^{L} d(n, i)h^{(2)}(iT_2)$$

The channel pulse response shape module (H) 304 may output the interference component signal 114 ($\hat{s}^{(2)}(nT_1)$) to the adders 308 and 310.

The adder 308 may subtract the interference component signal 114 ($\hat{s}^{(2)}(nT_1)$) from, for example, the equalized signal 110 ($z_n$) to generate the cleaned signal 116 ($z'_n$). Similarly, the adder 310 may subtract the interference component signal 114 ($\hat{s}^{(2)}(nT_1)$) from the signal 318 which may be the equalized signal 110 ($z_n$) to generate an error signal $e_n$ 316.

The error signal $e_n$ 316 may be returned to the channel pulse response shape module (H) 304 for use in adaptation.

The adaptation of $h_i$ may be implemented using a least mean square (LMS) method or other similar adaptation algorithm. Some embodiments using LMS adaptation may minimize the squared error as:

$$e^2(n) = (z(nT_1) - \hat{s}^{(2)}(nT_1))^2$$

In such embodiments, the gradient for adapting the tap $h_i^{(2)}$ may be written as:

$$\frac{\partial e^2(n)}{\partial h_i^{(2)}} = -2e \frac{\partial \hat{s}^{(2)}(nT_1)}{\partial h_i^{(2)}} = -2ed(n, i)$$

As such, the update equation for $h_i^{(2)}$ may be written as:

$$h_i^{(2)}(n+1) = h_i^{(2)}(n) + \mu ed(n,i), \; i = -L, \ldots, L$$

where $\mu$ is a step size control for adaptation.

In some embodiments, the adaptation of the pulse response shape $h_i^{(2)}$ may absorb any remaining fractional portion of $T_1$ of the delay between the side track data and the center track signal.

The detector 312 may operate to determine the underlying data corresponding to the center track signal based on the bit sequence represented by the samples of the cleaned signal 116.

Figure 4:
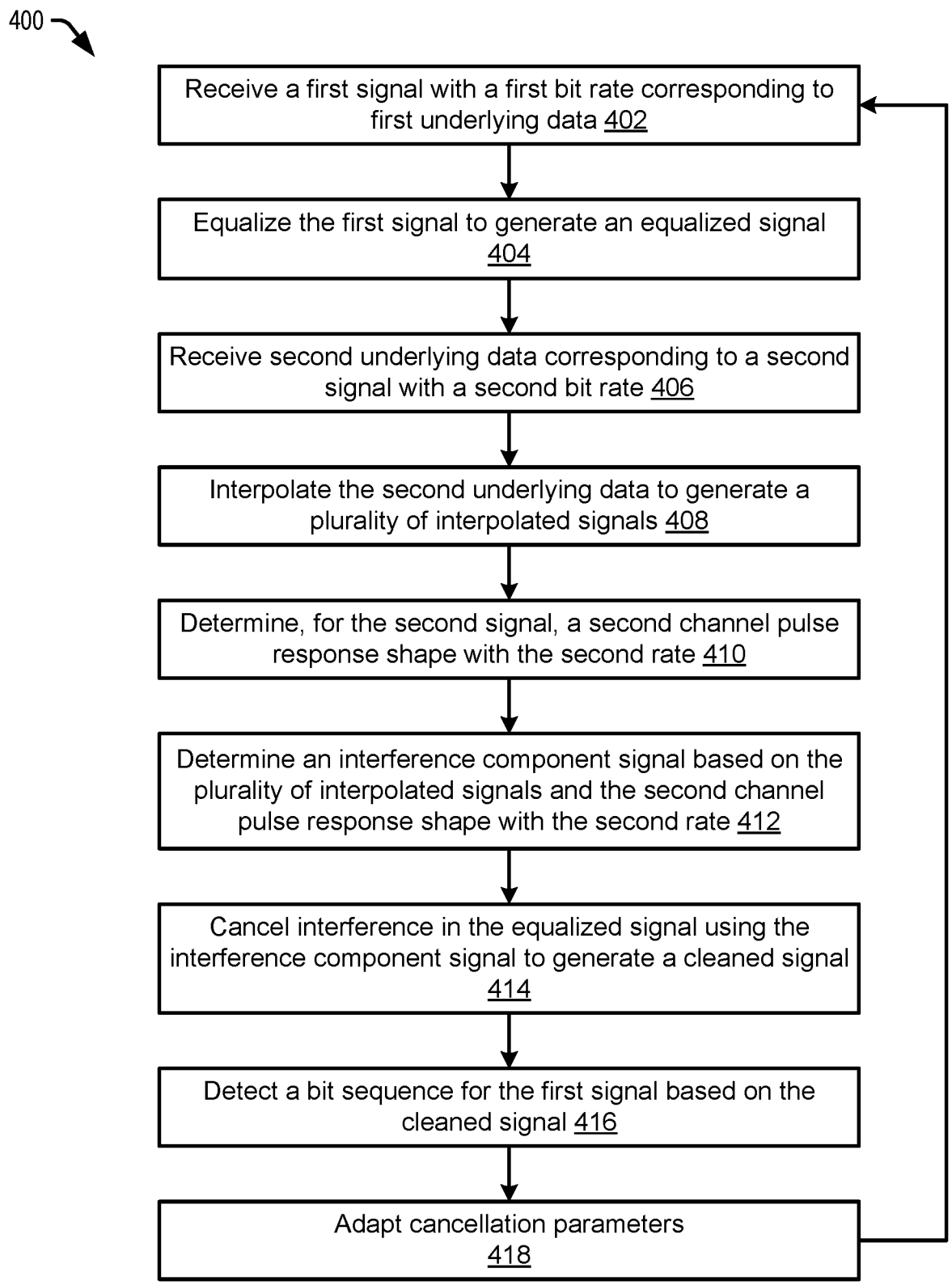
FIG. 4 is a flowchart of a method of asynchronous interference cancellation, in accordance with certain embodiments of the present disclosure.

Referring to FIG. 4, a flowchart of a method of asynchronous interference cancellation is shown and is generally designated 400. The method 400 can be an embodiment of the operations of systems 100-300. The order in which the operations are described is not intended to be construed as a limitation, and any number of the described operations can be combined in any order and/or in parallel to implement the process.

The system may receive a first signal with a first bit rate corresponding to first underlying data, at 402. The first signal may be equalized to generate an equalized signal, at 404. The system may receive second underlying data corresponding to a second signal with a second bit rate, at 406. The second underlying data may be interpolated at 408 to generate a plurality of interpolated signals. At 410, the system may determine, for the second signal, a second channel pulse response shape with the second rate. At 412, the system may determine an interference component signal based on the plurality of interpolated signals and the second channel pulse response shape with the second rate. The system may then cancel the interference in the equalized signal using the interference component signal to generate a cleaned signal, at 414. A bit sequence for the first signal may be detected based on the cleaned signal, at 416. At 418, the system may adapt cancellation parameters based on the interference component signal.

The process may repeat at 402. Additionally or alternatively, after block 414, blocks 406-414 may be repeated using the cleaned signal as the equalized signal and another adjacent signal as the second signal, for example, until all adjacent signals contributing interference to the signal 110 have been accounted for. This and other variations would be apparent to one of ordinary skill in the art in view of this specification.

All steps listed for the method 400 may be applied to communication systems that have adjacent signals or a second signal that allows for the error signal herein to be calculated. Components and circuits used to perform the operations in the method may be discrete, integrated into a system on chip (SOC), or other circuits. Further, the steps can be carried out in a processor (e.g. a digital signal processor), implemented in software, implemented via firmware, or by other means.

Figure 5:
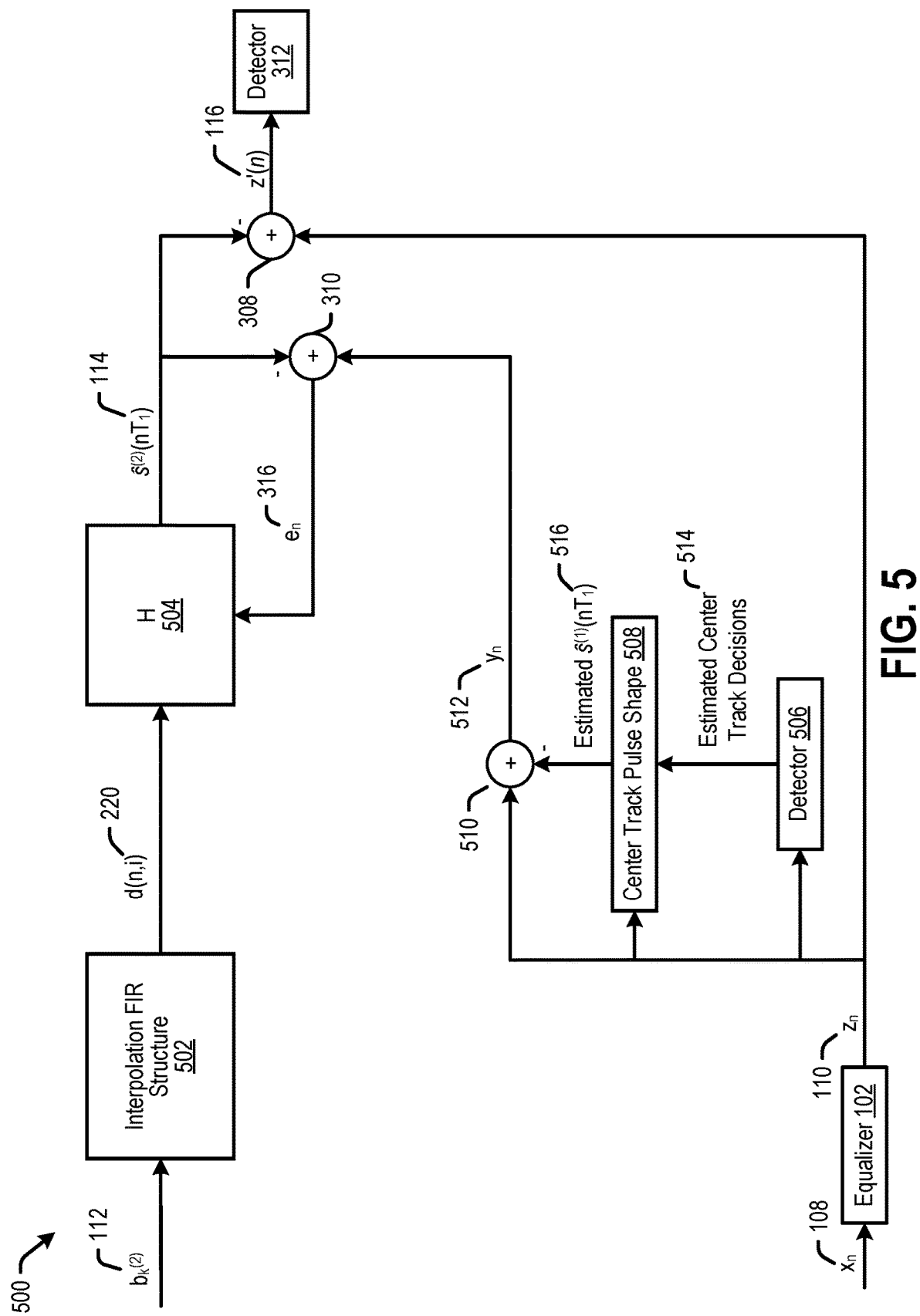
FIG. 5 is a block diagram of a system of interference cancellation, in accordance with certain embodiments of the present disclosure.
Figure 6:
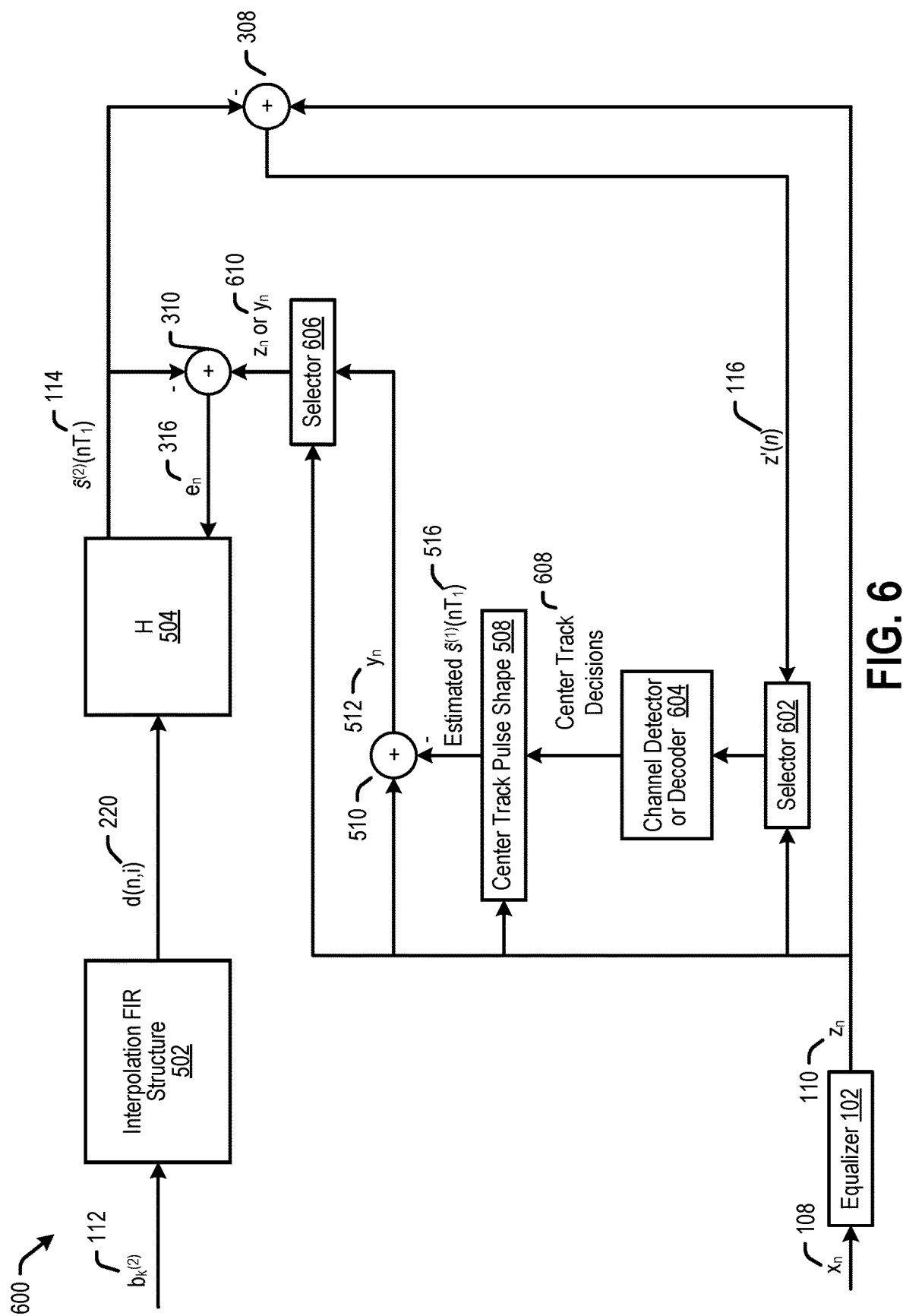
FIG. 6 is a block diagram of a system of interference cancellation, in accordance with certain embodiments of the present disclosure.
Figure 7:
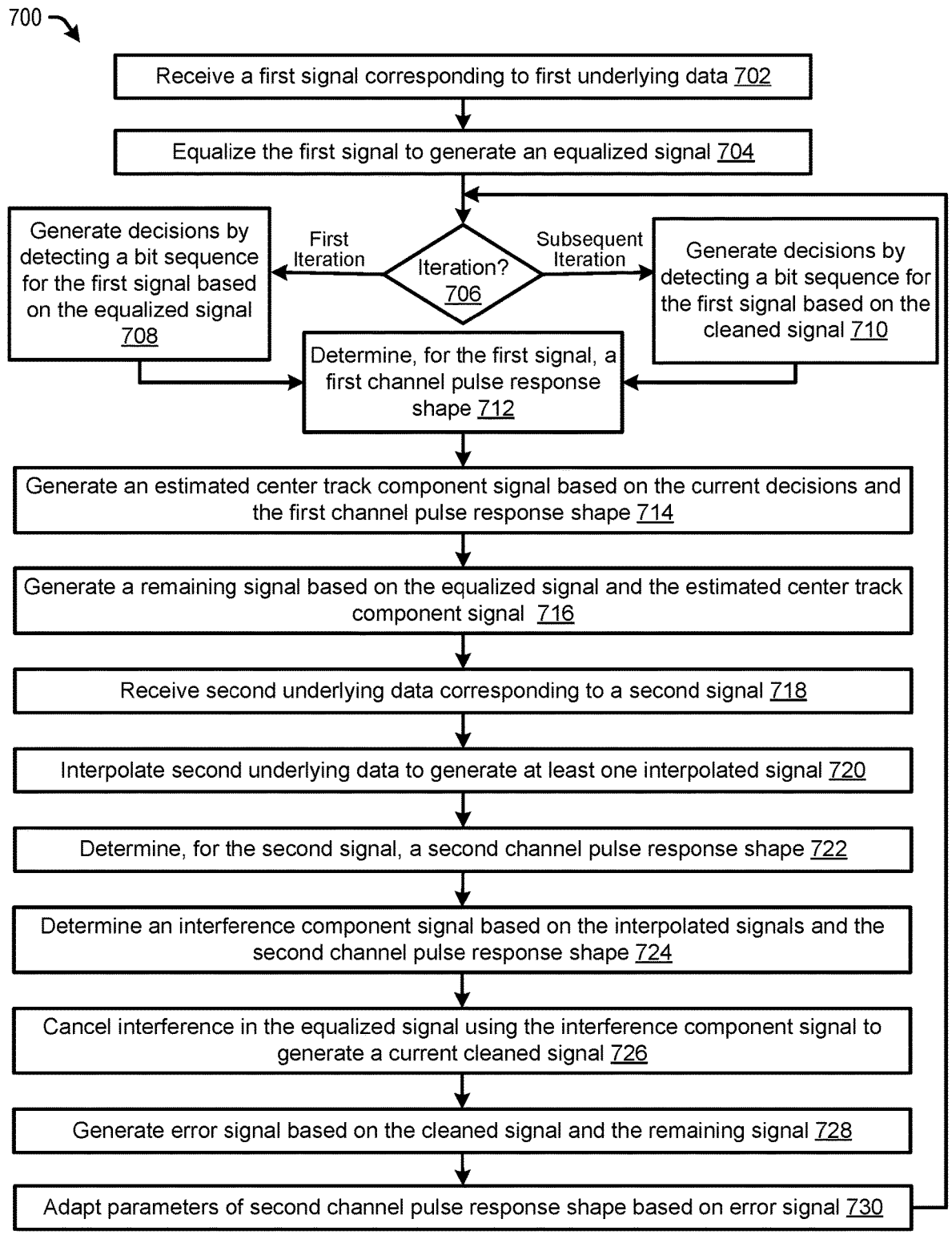
FIG. 7 is a flowchart of a method of interference cancellation, in accordance with certain embodiments of the present disclosure.

FIGS. 5-7 relate to the systems and techniques which may operate to provide an error signal, for example, for adaptation of the operation of the channel pulse response shape module (H) based on an estimated signal of interest $\hat{s}^{(1)}(nT_1)$. For example, an estimated signal of interest $\hat{s}^{(1)}(nT_1)$ may be generated based on estimated decisions for the signal of interest and used in generation of the error signal. The estimated decisions may be generated by a loop detector, a channel detector, an iterative decoding circuit, or other similar circuits. As discussed below, the generation of the error signal based on the estimated signal of interest $\hat{s}^{(1)}(nT_1)$ may be performed in conjunction with a similar structure to that of FIG. 2 to generate an interference component signal 114 ($\hat{s}^{(2)}(nT_1)$) based on the streams {d(n,i)}, i=-L, ..., L or may utilize various other techniques to generate an interference component signal ($\hat{s}^{(2)}(nT_1)$).

The discussion of FIGS. 5-7 may be in the context of a magnetic storage medium and asynchronous data rates between tracks. However, this merely for ease of discussion and for illustrative purposes and is not meant to limit the disclosed systems and techniques to such embodiments.

Referring to FIG. 5, a block diagram of a system of interference cancellation is shown and is generally designated 500. As shown, system 500 may include the system 200 and portions of system 300. In particular, the system 500 may include an interpolation FIR structure 502 and a channel pulse response shape module (H) 504. The interpolation FIR structure 502 may include the flow control module 202 which may be coupled to the FIR(-L) 204(-L) to FIR(L) 204(L), delay gates 206(1)-206(N), phase accumulator 208, FIR coefficient LUT 210 and a correlation module 306 as discussed above with respect to FIGS. 2 and 3. The interpolation FIR structure 502 may be coupled to the channel pulse response shape module (H) 504. The channel pulse response shape module (H) 504 may be coupled to the adders 308 and 310. In turn, the adder 310 may be coupled to the channel pulse response shape module (H) 504. In addition, the system 500 may include the equalizer 102, a detector 506, a center track pulse shape module 508, and an adder 510. The equalizer 102 may be coupled to the adder 308, the detector 506, the center track pulse shape module 508 and the adder 510. The detector 506 may be coupled to the center track pulse shape module 508 which, in turn, may be coupled to the adder 510. The adder 510 may also be coupled to the adder 310.

As mentioned above, the interpolation FIR structure 502 may include the flow control module 202, the FIR(-L) 204(-L) to FIR(L) 204(L), delay gates 206(1)-206(N), phase accumulator 208, FIR coefficient LUT 210 and correlation module 306. The interpolation FIR structure 502 may receive the underlying data corresponding to the adjacent signal 112 ($b_k^{(2)}$) and may operate as discussed above with respect to FIGS. 2 and 3 to determine the streams d(n,i) 220.

The channel pulse response shape module (H) 504 may operate to generate and apply a channel pulse response shape $h_i^{(2)}$ to the streams d(n,i) 220 to generate the interference component signal 114 ($\hat{s}^{(2)}(nT_1)$).

The channel pulse response shape module (H) 504 may output the interference component signal 114 ($\hat{s}^{(2)}(nT_1)$) to the adders 308 and 310.

As previously discussed with respect to FIG. 1, the equalizer 102 may receive a signal of interest 108 ($x_n$) from which interference is to be cancelled. The equalizer 102 may generate an equalized signal 110 ($z_n$) based on the signal 108. The equalizer 102 may output the equalized signal 110 ($z_n$) to the adder 308, the detector 506, the center track pulse shape module 508 and the adder 510.

The adder 308 may subtract the interference component signal 114 ($\hat{s}^{(2)}(nT_1)$) from, for example, the equalized signal 110 ($z_n$) to generate the cleaned signal 116 ($z'_n$). Similarly, the adder 310 may subtract the interference component signal 114 ($\hat{s}^{(2)}(nT_1)$) from a the remaining signal ($y_n$) 512 (discussed further below) to generate an error signal $e_n$ 316.

The error signal $e_n$ 316 may be returned to the channel pulse response shape module (H) 504 for use in adaptation. The adaptation of $h_i$ by may be implemented using a least mean square (LMS) method or other similar adaptation algorithm based on the error signal $e_n$ 316 as discussed above. For example, in some embodiments, the channel pulse response shape module (H) 504 may perform LMS adaptation by minimizing the squared error:

$$e^2(n) = (y(nT_1) - \hat{s}^{(2)}(nT_1))^2$$

The detector 312 may operate to determine the underlying data corresponding to the center track signal based on the bit sequence represented by the samples of the cleaned signal 116 ($z'_n$).

In general, the remaining signal 512 ($y_n$) may be the result of subtracting an estimation of the center track signal or signal of interest without interference and noise (also referred to herein as estimated center track signal) from the equalized signal 110 ($z_n$). As discussed above, the digitized equalized signal 110 ($z_n$) may be written with an index n as:

$$z(nT_1) = s^{(1)}(nT_1) + s^{(2)}(nT_1) + N(nT_1)$$

Removing $\hat{s}^{(1)}(nT_1)$ from $z(nT_1)$ may provide a remaining signal which includes the interference component from the adjacent signal or track (e.g. $s^{(2)}(nT_1)$) and a noise component of the equalized signal 110 (e.g. $N(nT_1)$).

In some embodiments, an estimated center track signal ($\hat{s}^{(1)}(nT_1)$) may be generated based on estimated center track decisions and a center track pulse shape. The estimated center track signal ($\hat{s}^{(1)}(nT_1)$) may be subtracted from the equalized signal 110 ($z_n$) to provide the remaining signal 512 ($y_n$).

As will be discussed further below, the utilization of the remaining signal 512 ($y_n$) to determine the error signal $e_n$ 316 for adaptation of the channel pulse response shape module (H) 504 may provide better performance in some scenarios in comparison to the use of the equalized signal 110 ($z_n$) as shown in FIG. 2.

Returning to the operation of system 500, the detector 506 may operate to estimate the underlying data corresponding to the center track signal (also referred to herein as estimated center track decisions) based on the bit sequence represented by the samples of the equalized signal 110 ($z_n$). The detector 506 may be any suitable type of detector, such as a simplified detector (e.g. a loop detector) or a more advanced detector (e.g. a SOVA detector). In other embodiments, such as that shown in FIG. 6, the detector that may generate estimated center track decisions may be the main detector or decoder of the channel instead of a separate detector or decoder. The resulting estimated center track decisions $\hat{b}_k^{(1)}$ 514 may be output to the center track pulse shape module 508.

The center track pulse shape module 508 may operate to adapt a channel pulse response shape, for example, using LMS in a similar manner to that discussed above with respect to the channel pulse response shape module (H) (e.g. 304 or 504).

The center track pulse shape module 508 may generate an estimated center track signal $\hat{s}^{(1)}(nT_1)$ 516. For example, the estimated center track signal $\hat{s}^{(1)}(nT_1)$ 516 may be estimated based on the estimated center track decision $\hat{b}_k^{(1)}$ 514 and a center track pulse shape $h_i^{(1)}$ as:

$$\hat{s}^{(1)}(nT_1) = \sum_i h_i^{(1)} \hat{b}_{n-i}^{(1)}$$

The center track pulse shape module 508 may then output the estimated center track signal $\hat{s}^{(1)}(nT_1)$ 516 to the adder 510.

The adder 510 may generate the remaining signal 512 ($y_n$). More particularly, the adder 510 may subtract the estimated center track signal 516 ($\hat{s}^{(1)}(nT_1)$) from the equalized signal 110 ($z_n$). As such, the remaining signal 512 ($y_n$) may be written as:

$$y_n = y(nT_1) = z(nT_1) - \hat{s}^{(1)}(nT_1)$$

The remaining signal 512 ($y_n$) may also be written as the sum of the adjacent signal interference component and some noise:

$$y(nT_1) = s^{(2)}(nT_1) + \tilde{N}(nT_1)$$

In this representation, the noise $\tilde{N}(nT_1)$ may include the original noise $N(nT_1)$ and additional noise added by any inaccuracy of the estimated center track signal 516 ($\hat{s}^{(1)}(nT_1)$), (e.g. the difference between $s^{(1)}(nT_1)$ and the estimated center track signal 516 $\hat{s}^{(1)}(nT_1)$). The additional noise may depend on the bit error rate (BER) in the estimated decisions $\hat{b}_k^{(1)}$ 514.

As previously discussed, the remaining signal 512 may be utilized to determine the error signal $e_n$ 316 for adaptation of the channel pulse response shape module (H) 504. As shown by FIGS. 3 and 5, embodiments may utilize either the equalized signal $z(nT_1)$ or the remaining signal $y(nT_1)$ to determine the error signal $e_n$ 316 for use in the LMS algorithm. Specifically, both the equalized signal 110 ($z_n$) and the remaining signal 512 ($y_n$) may include the adjacent signal interference component $s^{(2)}(nT_1)$. However, the equalized signal 110 ($z_n$) may include the center track signal $s^{(1)}(nT_1)$. The center track signal $s^{(1)}(nT_1)$ may be regarded as the noise when using LMS to estimate the side track pulse shape. Since the center track signal $s^{(1)}(nT_1)$ may be relatively large in comparison to the adjacent signal interference component $s^{(2)}(nT_1)$, the adaptation may be noisy. Because of this noise, the performance of adjacent track interference cancellation may suffer. As such, the use of the remaining signal 512 ($y_n$) may provide better performance in some scenarios.

While using the remaining signal 516 may reduce the noise level and provide better performance in some cases, the additional noise $\tilde{N}(nT_1)$ added in the remaining signal 512 ($y_n$) may depend on the accuracy of the decisions 514 ($\hat{b}_k^{(1)}$). Errors in the decisions 514 ($\hat{b}_k^{(1)}$) may result in inaccurate estimation of the estimated center track signal 516 ($\hat{s}^{(1)}(nT_1)$) which may increase the noise level. As such, some embodiments may selectively utilize the remaining signal 512 ($y_n$) and the equalized signal 110 ($z_n$) for determining the error signal $e_n$ 316. For example, the remaining signal 512 ($y_n$) may be utilized when the BER is relatively low and the equalized signal 110 ($z_n$) may be utilized when the BER is higher.

Referring to FIG. 6, a block diagram of a system of interference cancellation is shown and is generally designated 600. As shown, system 600 may be a variation of system 500. More particularly, the system 600 may be an iterative variation of the system 500 which is modified to selectively utilize the remaining signal 512 based on an error rate in the decisions used to generate the remaining signal 512. For sake of brevity, the description of system 600 herein focuses on its variation from system 500 and avoids repetition of similar structures and functions.

As illustrated, in addition to the structure shown in FIG. 5, system 600 may further include a selector 602, a channel detector or decoder 604 (also referred to herein as detector 604) and a selector 606. The detectors 312 and 506 are not shown. For example, the detector 604 may be the same as detector 312 or different and detector 506 may not be present as the embodiment shown in FIG. 6 may utilize the main channel detector or decoder (e.g. detector 604) to generate the decisions 608 instead of a separate detector 506. In some embodiments, the detector 604 may be an iterative decoder such as an error correcting code (ECC) decoder. For example, when an LDPC code is used, the LDPC decoder may send extrinsic information to the SOVA detector while providing the current decisions 606 to the center track pulse shape module 508.

The equalizer 102 and adder 308 may be coupled to the selector 602 in place of the previously described coupling to the detectors 312 and 506 and provide the equalized signal 110 ($z_n$) and cleaned signal 116 ($z'_n$) to the selector 602, respectively. The equalizer 102 may further be coupled to the selector 606 and may provide the equalized signal 110 ($z_n$) to the selector 606. Similarly, the adder 510 may be coupled to the selector 606 in place of the previously described coupling to the adder 310. The adder 510 may provide the remaining signal 512 ($y_n$) to the selector 606. The selector 602 may be coupled to the detector 604 and may selectively provide one of the equalized signal 110 ($z_n$) and cleaned signal 116 ($z'_n$) to the detector 604. The detector 604 may be coupled to the center track pulse shape module 508 and may provide center track decisions 608 ($\hat{b}_k^{(1)}$) to the center track pulse shape module 508. Further, the selector 606 may be coupled to the adder 310 and may selectively provide one of equalized signal 110 ($z_n$) and remaining signal 512 ($y_n$) to the adder 310.

In operation, in a first iteration, selector 602 may provide the equalized signal 110 ($z_n$) to the detector 604. In turn, the detector 604 may generate decisions 608 based on the equalized signal 110 ($z_n$). As such, the decisions of this iteration may have not interference cancellation. The operations of the first iteration may continue as described above with respect FIGS. 2-5. For the second and subsequent iterations, the selector 602 may receive the cleaned signal 116 (z'(n)) of the first iteration. The selector 602 may select and provide the cleaned signal 116 (z'(n)) to the detector 604 for generation of decisions 608 and the subsequent estimation of the estimated center track signal 516 ($\hat{s}^{(1)}(nT_1)$). The use of the cleaned signal 116 (z'(n)) in subsequent iterations may provide improved BER. As the BER improves, the estimation of the center track signal may also be improved, thus iteratively providing an improved final BER.

As mentioned above, the selector 606 may selectively provide one of equalized signal 110 ($z_n$) and remaining signal 512 ($y_n$) to the adder 310 as a signal 610. For example, the selector 606 may operate to select between the equalized signal 110 ($z_n$) and remaining signal 512 ($y_n$) based on a bit error rate in the center track decisions. The detector 604 may provide a measure of bit error rate to the selector 606 to allow the selector 606 to select a signal. Alternatively, the detector 604 may determine a selection signal and output the selection signal to the selector 606. By selecting between the equalized signal 110 ($z_n$) and remaining signal 512 ($y_n$), noise due to estimating the center track signal based on erroneous decisions may be reduced. Further, some embodiments may not include a selector 606 and may use the remaining signal 512 ($y_n$) in all subsequent iterations.

Referring to FIG. 7, a flowchart of a method of interference cancellation is shown and is generally designated 700. The method 700 can be an embodiment of the operations of systems 500-600. The order in which the operations are described is not intended to be construed as a limitation, and any number of the described operations can be combined in any order and/or in parallel to implement the process.

The system may receive a first signal corresponding to first underlying data, at 702. The first signal may be equalized to generate an equalized signal, at 704. At 706, the system may determine whether a current iteration is a first iteration or a subsequent iteration. If the current iteration is the first iteration, the process may continue to 708. Otherwise, the process may continue to 710.

At 708, the system may generate decisions by detecting a bit sequence for the first signal based on the equalized signal. At 710, the system may generate decisions by detecting a bit sequence for the first signal based on the cleaned signal of the prior iteration. Following 708 and 710, the process may continue to 712.

At 712, the system may determine, for the first signal, a first channel pulse response shape. At 714, the system may generate an estimated center track component signal based on the current decisions and the first channel pulse response shape. The system may then generate a remaining signal based on the equalized signal and the estimated center track component signal at 716.

The system may receive second underlying data corresponding to a second signal, at 718. The second underlying data may be interpolated at 720 to generate at least one interpolated signal. At 722, the system may determine, for the second signal, a second channel pulse response shape. At 724, the system may determine an interference component signal based on the at least one interpolated signal and the second channel pulse response shape. The system may then cancel the interference in the equalized signal using the interference component signal to generate a current cleaned signal, at 726. The current cleaned signal may be returned to the detector or decoder and utilized for a subsequent iteration.

At 728, the system may generate an error signal based on the interference component signal and the remaining signal. At 730, the system may adapt the parameters of the second channel pulse shape based on the error signal, for example using LMS adaptation. As previously discussed, generating an error signal by subtracting the remaining signal from the interference component signal may provide for less noisy LMS adaptation and better performance in some scenarios (e.g. where the decisions do not have a high BER).

The process may repeat at 706. At each iteration of either 708 or 710, the process may end if the data underlying the first signal is successfully recovered (e.g. if the current decisions are determined to be correct, for example, using an ECC code). Additionally or alternatively, blocks 706-730 may be repeated using a current iteration of a cleaned signal as the equalized signal and another adjacent signal as the second signal, for example, until all adjacent signals contributing interference to the signal 110 have been accounted for. This and other variations would be apparent to one of ordinary skill in the art in view of this specification.

All steps listed for the method 700 may be applied to communication systems that have adjacent signals or a second signal that allows for the error signal herein to be calculated. Components and circuits used to perform the operations in the method may be discrete, integrated into a system on chip (SOC), or other circuits. Further, the steps can be carried out in a processor (e.g. a digital signal processor), implemented in software, implemented via firmware, or by other means.

FIGS. 5-7 include the interpolation FIR structure 502 and other functionality related to asynchronous data rates. As previously mentioned, the improvements to the generation of the interference component signal discussed with respect to FIGS. 5-7 may be applied in systems with synchronous data rates which may not include the interpolation FIR structure 502 and other functionality related to asynchronous data rates. For example, in a synchronous data rate system, the side track data can be applied directly to generate the side track pulse response, the side track estimated signal and be used for correlation.

Figure 8:
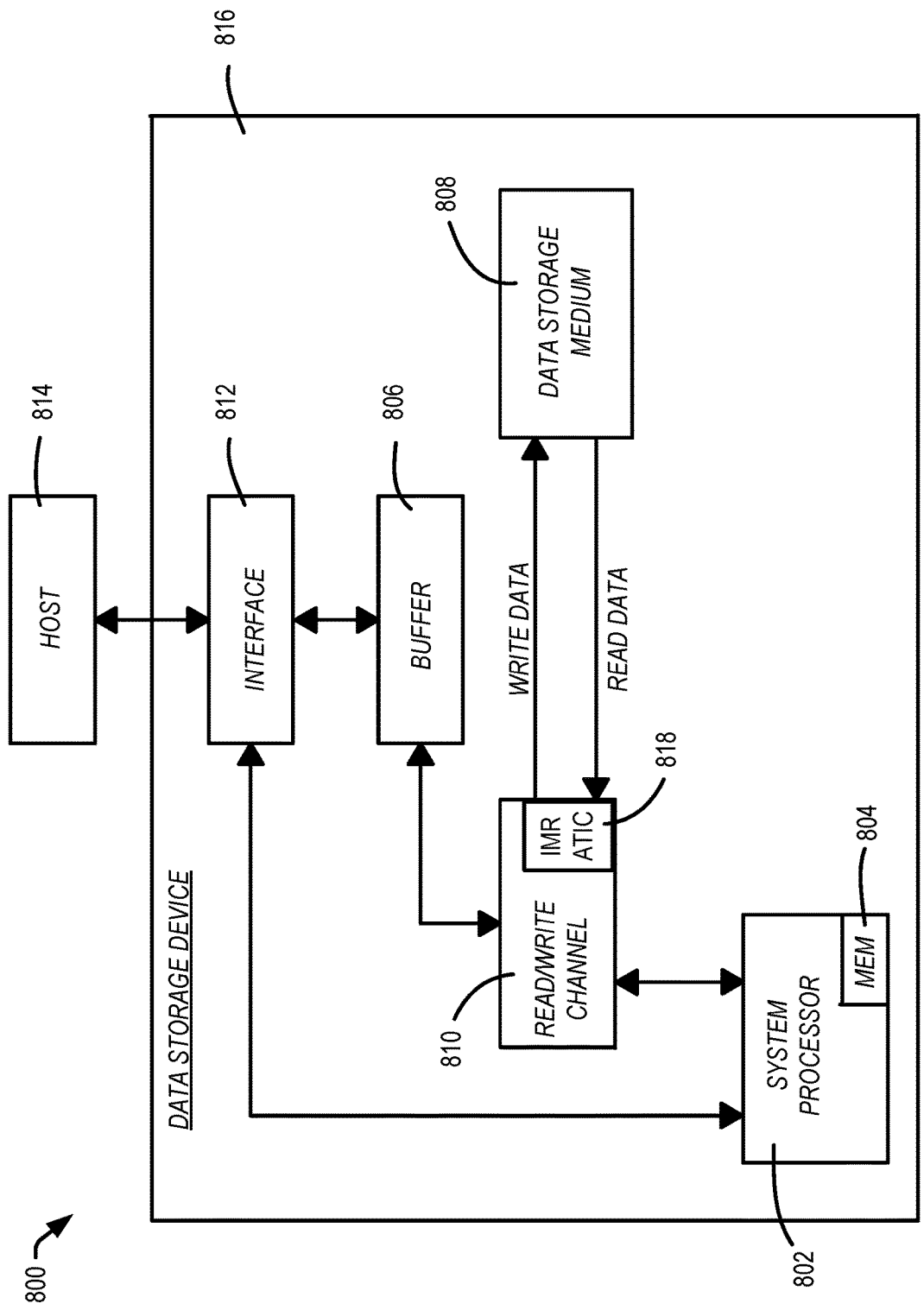
FIG. 8 is a block diagram of a system of asynchronous adjacent track interference cancellation, in accordance with certain embodiments of the present disclosure.
Figure 9:
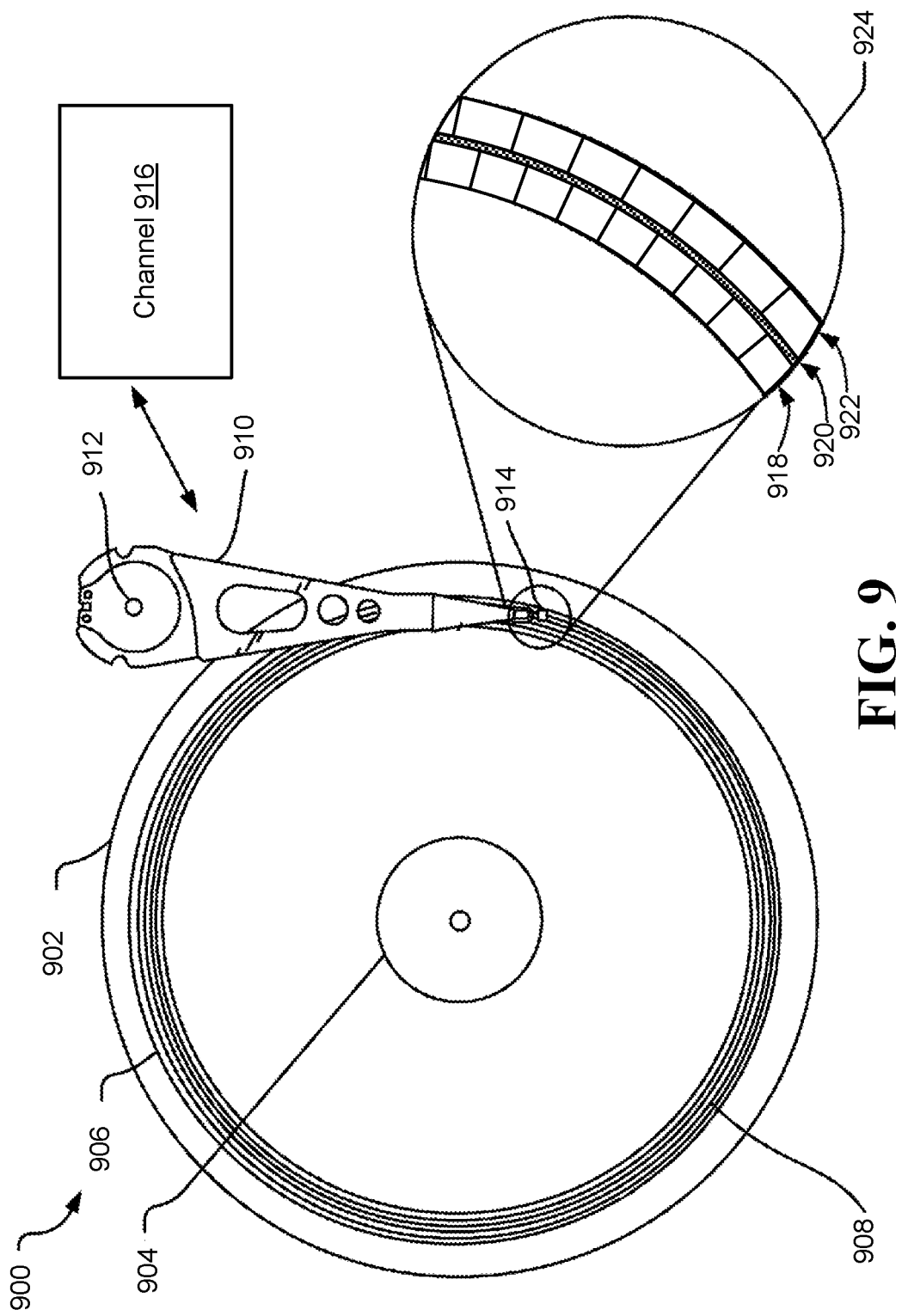
FIG. 9 is a block diagram of a system of asynchronous adjacent track interference cancellation, in accordance with certain embodiments of the present disclosure.
Figure 10:
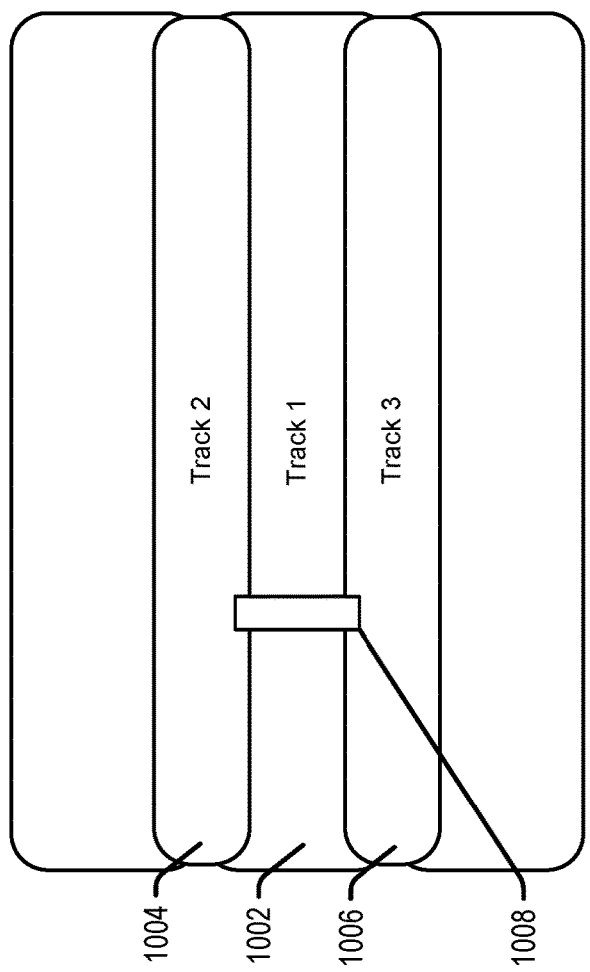
FIG. 10 is a diagram illustrating asynchronous adjacent track interference cancellation, in accordance with certain embodiments of the present disclosure.

FIGS. 8-10 illustrate example environments in which asynchronous interference cancellation may be implemented. In particular, FIGS. 8-10 illustrate an interleaved magnetic recording (IMR) hard drive system with different channel bit densities (CBD) between tracks. In IMR, tracks may be written in two passes using two kinds of writers or writer settings whose primary distinction is the writer width. In the first pass, a wide writer or write setting may be used to write tracks, which can be assumed to be even-numbered. These tracks may be written at a high CBD, for example, because the wide writer or write setting produces low transition jitter noise. In the second pass, a narrow writer or write setting may be used to write the odd-numbered tracks in such a way that the odd-numbered tracks may overlap with (e.g. overwrites) the edges of even-numbered tracks as illustrated and discussed with regard to FIGS. 9 and 10. This may result in all tracks being narrow and the even tracks exhibiting low transition noise. Thus, a high average track density and CBD may be achieved.

By packing tracks close to one another, interference from adjacent tracks may arise. For example, interference can arise because the reader response may be wider than the written track due to manufacturing constraints. In addition, an even track can be written so that it encroaches on the odd track by slightly overlapping the first track (the area of the first track). If the overlap is significant enough, corrupted data value(s) may be created on the first track and the data value previously written onto the first track may no longer be discernible without interference cancellation.

The asynchronous interference cancellation techniques described above with regard to FIGS. 1-7 may alleviate the interference even though the bits on the track of interest (or main track) and adjacent tracks may not be synchronized due to the unequal data rates of the tracks.

Referring to FIG. 8, a block diagram of a system of asynchronous interference cancellation is shown and generally designated 800. The system 800 can be an example of a data storage device (DSD), and may be an example implementation of systems 100-300 and 500-600. The DSD 816 can optionally connect to and be removable from a host device 814, which can be a device or system having stored data, such as a desktop computer, a laptop computer, a server, a digital video recorder, a photocopier, a telephone, a music player, other electronic devices or systems not listed, or any combination thereof. The data storage device 816 can communicate with the host device 814 via the hardware/firmware based host interface circuit 812 that may include a connector (not shown) that allows the DSD 816 to be physically connected and disconnected from the host 814.

The DSD 816 can include a system processor 802, which may be a programmable controller, and associated memory 804. The system processor 802 may be part of a system on chip (SOC). A buffer 806 may temporarily store data during read and write operations and can include a command queue. The read/write (R/W) channel 810 can encode data during write operations to, and reconstruct data during read operations from, the data storage medium 808. The data storage medium 808 is shown and described as a hard disc drive, but may be other types of medium, such as a flash medium, optical medium, or other medium, or any combination thereof.

The R/W channel 810 may receive data from more than one data storage medium at a time, and in some embodiments can also receive multiple data signals concurrently, such as from more than one output of a read head. For example, storage systems having two-dimensional magnetic recording (TDMR) systems can have multiple reading or recording elements, and can read from two tracks simultaneously or nearly simultaneously. Multi-dimensional recording (MDR) systems can receive two or more inputs from multiple sources (e.g. recording heads, flash memory, optical memory, and so forth). The R/W channel 810 can combine multiple inputs and provide a single output, as described in examples herein.

The IMR ATIC 818 (interleaved magnetic recording asynchronous track interference canceller) can implement all of or at least part of the systems and functionality of systems and methods 100-700. In some embodiments, the IMR ATIC 818 may be a separate circuit, integrated into the R/W channel 810, included in a system on chip, firmware, software, or any combination thereof.

Referring to FIG. 9, a block diagram of a system of asynchronous interference cancellation in the context of a hard disc drive system is shown and generally designated 900. A disc 902 includes an inner diameter 904 and an outer diameter 906 between which are a number of concentric data tracks 908, illustrated by circular dashed lines.

Information may be written to and read from the data tracks 110 on the disc 902. A transducer head 914 may be mounted on an actuator assembly 910 at an end distal to an actuator axis of rotation 912. The transducer head 914 may fly in above the surface of the disc 902 during disc operation. The actuator assembly 910 may rotate during a seek operation about the actuator axis of rotation 912 positioned adjacent to the disc 902. The seek operation may position the transducer head 914 over a target data track of the data tracks.

The exploded view 924 illustrates two overlapping tracks. A first track 918 is shown with a first channel bit density. A second track 922 is shown with a second channel bit density. The region 920 shows an area where the two tracks may be overlapped in some examples.

Channel 916 can include circuits and other elements that can be utilized to cancel interference from adjacent tracks. As mentioned above, variance in the region of overlap 920 may lead to asynchronous adjacent track interference. Thus, channel 916 may implement the systems and functions described herein to compensate for asynchronous adjacent track interference.

FIG. 10 illustrates another potential source of asynchronous adjacent track interference. In particular, interference can arise when the cross-track reader response is wider than the track being read. In FIG. 10, track 1 1002 and the other wide tracks may be written first. The narrow tracks, including track 2 1004 and track 3 1006, may then be written over the edges of the wide tracks. In the illustrated example, the read head 1008 can have a read response that is wider than the tracks 1002-1006. As such, when reading track 1, the read head 1008 may pick up interference from track 2 1004 and track 3 1006. The channel 916 may operate to cancel the interference from track 2 1004 and track 3 1006 in the manner described above regarding FIGS. 1-7.

While discussed above in the context of IMR hard drive systems, the asynchronous interference cancellation techniques described above may also be applied in other systems, such as in hard drives where tracks in adjacent regions of tracks have differing bit rates. Further, the systems and methods described herein may be utilized for interference cancellation for signals with the same bit rates. Moreover, while the discussion herein relates to operations performed using an equalized signal, other systems may perform the disclosed techniques without an equalizer or with equalization performed at a different point in operation.

The illustrations, examples, and embodiments described herein are intended to provide a general understanding of the structure of various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, the figures and above description provide examples of architecture and voltages that may be varied, such as for design requirements of a system. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above examples, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. A system comprising:
    an equalizer circuit configured to generate an equalized signal based on a first signal;
    a canceller circuit including an input to receive a second signal that is a source of interference with the first signal and is asynchronous with the first signal, the canceller circuit configured to generate an interference signal, which is an estimate of interference in the first signal, using a pulse response shape of the second signal; and
    an adder circuit coupled to the equalizer circuit and the canceller circuit, the adder circuit configured to combine the equalized signal and the interference signal such that the estimate of interference is removed from the equalized signal to produce an output signal.

2. The system of claim 1 further comprising the first signal is a sequence of digital samples based on a continuous time input signal.

3. The system of claim 1 further comprising the first signal and the second signal are both bit sequences having different bit rates.

4. The system of claim 1 further comprising the equalized signal is an output of a filter of an input signal in a communications channel system.

5. The system of claim 1 further comprising the canceller circuit including a fixed length interpolation filter configured to implement different filter coefficients for different digital samples.

6. The system of claim 5 further comprising the canceller circuit including a flow control module, a finite impulse response (FIR) filter, a delay gate, a phase accumulator, and a FIR coefficient lookup table.

7. The system of claim 6 further comprising:
    the flow control module coupled to an interpolation FIR circuit that includes the FIR filter, the delay gate, the phase accumulator, the FIR coefficient lookup table;
    the flow control module configured to receive the second signal and provide selected data bits from the second signal to the interpolation FIR circuit;
    the interpolation FIR circuit coupled to a channel pulse response shape module and a correlation module;
    the interpolation FIR circuit configured to determine an input stream to the channel pulse response shape module;
    channel pulse response shape module configured to apply a channel pulse response shape to the input stream to generate the interference signal; and
    the correlation module coupled to the flow control module and configured to determine indices that are used by the flow control module to align the second signal and first signal.

8. The system of claim 7 further comprising the correlation module configured to receive a correlation enable signal from a controller when a starting index is being determined, the correlation enable signal configured to enable and disable operation of the correlation module.

9. The system of claim 7 further comprising an adder circuit configured to determine an error signal based on the interference signal and return the error signal to the channel pulse response shape module for use in adaptation of the channel pulse response shape.

10. The system of claim 1 further comprising a detector circuit coupled to the adder circuit and configured to determine underlying data corresponding to the first signal based on the output signal.

11. A system comprising:
    an equalizer circuit configured to generate an equalized signal based on a first signal;
    a canceller circuit configured to generate an interference signal that is an estimate of interference in the first signal;
    a first adder circuit coupled to the equalizer circuit and the canceller circuit, the adder circuit configured to combine the equalized signal and the interference signal such that the estimate of interference is removed from the equalized signal to produce an output signal;
    the canceller circuit including:
        an interpolation finite impulse response (FIR) circuit;
        a channel pulse response shape module coupled to the interpolation FIR circuit;
        the interpolation FIR circuit configured to determine an input stream to the channel pulse response shape module; and the channel pulse response shape module configured to apply a channel pulse response shape to the input stream to generate the interference signal.

12. The system of claim 11 further comprising:
a decoder circuit;
a first pulse shape module coupled to the decoder circuit;
a first selector circuit coupled to the equalizer circuit to receive the equalized signal and coupled to the adder circuit to receive the output signal, the first selector circuit configured to selectively provide one of the equalized signal and the output signal to the decoder circuit;
the first pulse shape module configured to adapt a channel pulse response shape to generate an estimated signal; and
a second adder circuit coupled to the first pulse shape module and configured to generate the estimated signal from the equalized signal to produce a remaining signal; and
the canceller circuit configured to determine an error signal based on the remaining signal and provide the error signal to the channel pulse response shape module for use in adaptation of the channel pulse response shape.

13. The system of claim 12 further comprising:
a second selector circuit configured to receive the remaining signal and the equalized signal and to selectively provide one of the equalized signal and the remaining signal to a third adder; and
the third adder configured to generate an error signal from the interference signal and either the equalized signal and the remaining signal as provided by the second selector circuit.

14. The system of claim 13 further comprising the second selector circuit may selectively provide one of the equalized signal and the remaining signal to the third adder based on a bit error rate.

15. The system of claim 13 further comprising the decoder circuit configured to determine a selection signal based on a bit error rate and output the selection signal to the second selector to selectively provide one of the equalized signal and the remaining signal to the third adder.

16. The system of claim 13 further comprising the decoder is an iterative decoder and is configured to selectively receive the remaining signal when decisions used to generate the estimated signal have an error rate below a threshold and iteratively update the decisions using the output signal of a prior iteration.

17. A method for removing error from a first signal in a communication system, the method comprising:
generating an estimated signal based on a first signal representing data received from a communications channel and a first channel pulse response shape for the first signal;
generating an interference component signal that is an estimate of interference in the first signal based on a second signal;
subtracting the interference component signal from the estimated signal to produce an output signal;
generating a remaining signal based on the estimated signal and the output component signal;
generating an error signal based on the interference component signal and the remaining signal;
adapting one or more parameters of the first channel pulse response shape based on the error signal; and
updating the output signal based on the adapted one or more parameters.

18. The method of claim 17 further comprising generating the error signal from the interference component signal and either the equalized signal or the remaining signal based on a bit error rate of the output signal.

* * * * *